(12) United States Patent
Yanou et al.

(10) Patent No.: US 9,108,161 B2
(45) Date of Patent: Aug. 18, 2015

(54) WATER PURIFIER

(75) Inventors: Manabu Yanou, Toyohashi (JP); Futomitsu Horiuchi, Tokyo (JP); Hisashi Yano, Shanghai (CN)

(73) Assignee: MITSUBISHI RAYON CO., LTD., Tokyo (JP)

( * ) Notice: Subject to any disclaimer, the term of this patent is extended or adjusted under 35 U.S.C. 154(b) by 1214 days.

(21) Appl. No.: 11/569,346

(22) PCT Filed: May 17, 2005

(86) PCT No.: PCT/JP2005/008973
§ 371 (c)(1),
(2), (4) Date: Aug. 6, 2007

(87) PCT Pub. No.: WO2005/110926
PCT Pub. Date: Nov. 24, 2005

(65) Prior Publication Data
US 2008/0017565 A1   Jan. 24, 2008

(30) Foreign Application Priority Data

May 18, 2004   (JP) ................... 2004-148313

(51) Int. Cl.
*B01D 24/00* (2006.01)
*B01D 63/02* (2006.01)
(Continued)

(52) U.S. Cl.
CPC .............. *B01D 63/024* (2013.01); *B01D 61/18* (2013.01); *C02F 9/005* (2013.01);
(Continued)

(58) Field of Classification Search
CPC ........ B10D 27/02; B10D 27/06; B10D 27/08; B10D 27/10; B10D 27/108; B10D 35/00; B10D 35/02; B10D 35/027; B10D 35/04; B10D 35/14; B10D 35/147; B10D 35/157; B10D 35/1573; B10D 35/306; B10D 63/02; B10D 63/08; B10D 9/06; B10D 9/08; B10D 9/10; B10D 2201/04; B10D 2201/0415; B10D 2201/29; B10D 2201/30; B10D 2201/301; B10D 2201/307; B10D 2201/31; B10D 2201/316; F25D 31/002; B67D 1/0081; B67D 1/0082; B67D 1/0093; B67D 1/0094; B67D 1/0095; B67D 1/0889; B67D 1/0891; B67D 1/1277; B67D 3/0003; B67D 3/0025; B67D 3/0029; B67D 3/0032; B67D 3/0035; B67D 3/0038; B67D 3/0048
USPC ................ 210/232, 136; 222/153.03, 153.04, 222/189.06, 189.1, 189.11; 62/3.64
See application file for complete search history.

(56) References Cited

U.S. PATENT DOCUMENTS

| 4,636,307 A | * | 1/1987 | Inoue et al. ................... 210/188 |
| 5,003,790 A | | 4/1991 | Goupil |

(Continued)

FOREIGN PATENT DOCUMENTS

| CN | 2342865 Y | 10/1999 |
| CN | 2584549 Y | 11/2003 |

(Continued)

OTHER PUBLICATIONS

Machine translation of Naito, JP 2001-170620 is provided.*

(Continued)

*Primary Examiner* — Allison Fitzsimmons
(74) *Attorney, Agent, or Firm* — McDermott Will & Emery LLP

(57) ABSTRACT

The present invention provides a water purifier which is easily removable from a drinking water supply apparatus, and has a built-in filtration filter with high efficiency of purifying raw water of a bottle. The water purifier is removable from a drinking water supply apparatus, and the drinking water supply apparatus including a bottle for containing water and a main body which has a recess into which a neck of the bottle is insertable. The water purifier is characterized by being placed between the recess of the main body and the neck of the bottle.

3 Claims, 7 Drawing Sheets

(51) Int. Cl.
  *B01D 61/18* (2006.01)
  *C02F 9/00* (2006.01)
  *B01D 15/00* (2006.01)
  *C02F 1/28* (2006.01)
  *C02F 1/44* (2006.01)

(52) U.S. Cl.
  CPC ........ *B67D 2210/00005* (2013.01); *C02F 1/28* (2013.01); *C02F 1/44* (2013.01); *C02F 1/444* (2013.01); *C02F 2307/10* (2013.01)
  USPC ........... 210/265; 210/807; 210/232; 210/282; 210/477; 210/661; 222/153.03; 222/153.04; 222/189.06; 222/189.1; 222/189.11; 62/3.64

(56) References Cited

U.S. PATENT DOCUMENTS

| | | | | |
|---|---|---|---|---|
| 5,567,322 | A | * | 10/1996 | Rundle et al. ................ 210/455 |
| 5,647,416 | A | | 7/1997 | Desrosiers et al. |
| 6,641,719 | B1 | | 11/2003 | Naito |
| 2002/0040585 | A1 | * | 4/2002 | Chaney ........................ 62/237 |
| 2003/0052055 | A1 | * | 3/2003 | Akamatsu et al. ....... 210/500.23 |

FOREIGN PATENT DOCUMENTS

| | | |
|---|---|---|
| FR | 2838731 A1 | 10/2003 |
| JP | 60-165087 U | 11/1985 |
| JP | 1-83491 U | 6/1989 |
| JP | 11-309447 A | 11/1999 |
| JP | 2000-061456 A | 2/2000 |
| JP | 2001-170620 A | 6/2001 |
| JP | 2002-52382 A | 2/2002 |
| JP | 2002-263637 A | 9/2002 |
| JP | 2002-320967 A | 11/2002 |
| TW | 579907 Y | 3/2004 |
| WO | WO-01/40116 A1 | 6/2001 |

OTHER PUBLICATIONS

International Search Report for PCT/JP2005/008973 mailed Jul. 26, 2005.
Patent Abstracts of Japan for JP2002-320967 published Nov. 5, 2002.
A Supplementary European Search Report, mailed Jul. 30, 2013, which issued during the prosecution of Eurpean Application No. 05 74 4123.0, which corresponds to the present application.

* cited by examiner

WATER PURIFIER

CROSS REFERENCE TO PRIOR APPLICATION

This is a U.S. national phase application under 35 U.S.C. §371 of International Patent Application No. PCT/JP2005/008973, filed May 17, 2005, and claims the benefit of Japanese Application No. 2004-148313, filed May 18, 2004, both of which are incorporated by reference herein. The International Application was published in Japanese on Nov. 24, 2005 as International Publication No. WO2005/110926 A1 under PCT Article 21(2).

FIELD OF THE INVENTION

The present invention relates to a water purifier which is detachably attached to a drinking water supply apparatus.

DESCRIPTION OF THE RELATED ART

Conventionally, an installation-type of drinking water supply apparatus for family or office use is known. This type of drinking water supply apparatus is connected to a relatively capacious bottle or the like at the upper part of the drinking water supply apparatus body and supplies bottled water contained in the bottle as potable water from the front face of the drinking water supply apparatus body.

Commonly, the drinking water supply apparatus has a built-in cooling device or heater and normal temperature water, cooling water, or heated hot water prepared by the built-in cooling device or heater is supplied by the weight of the water itself, a pump, or motor.

Also, as an apparatus for obtaining only purified water, a portable-type small water purifier, in which a small quantity of the purified water is obtained easily, is known (for example, refer to Japanese Patent Application, First Publication No. 2002-320967).

However, in these conventional drinking water supply apparatuses, a bottle which is connected to the upper part of the drinking water supply apparatus main body and contains and supplies raw water is used for family or office. In these situations, it is often the case that the volume of the bottle is more than 10 L. When a general bottle having a volume of 19 L is used by a family of three people, it is often the case that the bottle is used for more than a week so that bacteria or the like propagate in potable water of the bottle, which was a problem in terms of hygiene.

Also, because the volume of the bottle is large, there is almost always the case that the end of the bottle is connected to the drinking water supply apparatus by simply setting it in without using a seal material in order to easily put on and take off the bottle from the drinking water supply apparatus. In this case, bacteria or the like enters from the connection of the bottle, which was also a problem in terms of hygiene.

In order to solve the problem, a potable/pitcher-type small water purifier may be used. However, when purified water obtained by this type of water purifier is used for many uses in the home, the amount of purified water is not sufficient because the water purifier has a limited volume. For this reason, a drinking water supply apparatus which has a large volume and can supply hygienic and safe potable water is required.

The present invention provides a water purifier to which the drinking water supply apparatus can be easily put on and taken off and has a built-in filtration filter for purifying bottled water.

SUMMARY OF THE INVENTION

In order to solve the above problem, a water purifier according to a first aspect of the present invention is removable from a drinking water supply apparatus, the drinking water supply apparatus including a bottle for containing water and a main body having a recess into which a neck of the bottle is insertable, and the water purifier is characterized by being placed between the recess of the main body and the neck of the bottle.

The water purifier according to a second aspect of the present invention is the water purifier according to the first aspect, characterized by having a protruding portion which is present at a bottom of a recessed portion and is insertable into an inside of the bottle; a neck portion which is insertable into the recess of the main body of the drinking water supply apparatus; and a filtration filter which is present in a water passage between the neck of the bottle for containing water and a projection disposed at a bottom of the recess of the main body of the drinking water supply apparatus.

A water purifier according to a third aspect is removable from the drinking water supply apparatus, the drinking water supply apparatus including the bottle for containing water and the main body having the recess into which the neck of the bottle is insertable, the water purifier comprising: the filtration filter which is present inside the projection disposed at a bottom of the recess of the main body, the projection being insertable into an inside of the bottle.

A water purifier according to a fourth aspect is removable from the drinking water supply apparatus, the water purifier has: a recessed portion into which a neck of a bottle for containing water is insertable; and a filtration filter which is present in a water passage between the neck of the bottle for containing water and a protruding portion which is present at a bottom of the recessed portion, the water passage communicating to the main body of the drinking water supply apparatus.

The water purifier of the present invention according to a fifth aspect is the water purifier according to any one of the first to fourth aspects, in which a hollow fiber membrane is used as the filtration filter.

The water purifier of the present invention according to a sixth aspect is the water purifier according to the fifth aspect, in which the hollow fiber membrane is a hydrophilic hollow fiber membrane.

The water purifier of the present invention according to a seventh aspect is the water purifier according to any one of the second to sixth aspects, in which the filtration filter is provided with a member which allows air to pass through but does not allow water to pass through.

The water purifier of the present invention according to an eighth aspect is the water purifier according to the seventh aspects, in which the member which allows air to pass through but does not allow water to pass through, is a hydrophobic hollow fiber membrane.

The water purifier of the present invention according to a ninth aspect is the water purifier according to the first to eighth aspects, further including: a pressure device or a suction device.

The present invention can provide a large quantity of hygienic and safe potable water with ease, because it is easy to add a function of purifying water into a conventional drinking water supply apparatus.

Also, it is easy to exchange the water purifier because the water purifier can be detachably connected.

Moreover, because bacteria or dust can be cut out by using a hollow fiber membrane, more hygienic potable water can be obtained. In addition, by combining a hydrophobic hollow fiber for taking in air, because the amount of flowing prevented from reducing due to the pressure loss of the hollow fiber membrane even if water is filtrated by the weight of the water itself, a sufficient amount of purified water can be obtained for a short time.

DETAILED DESCRIPTION

Figure 1:
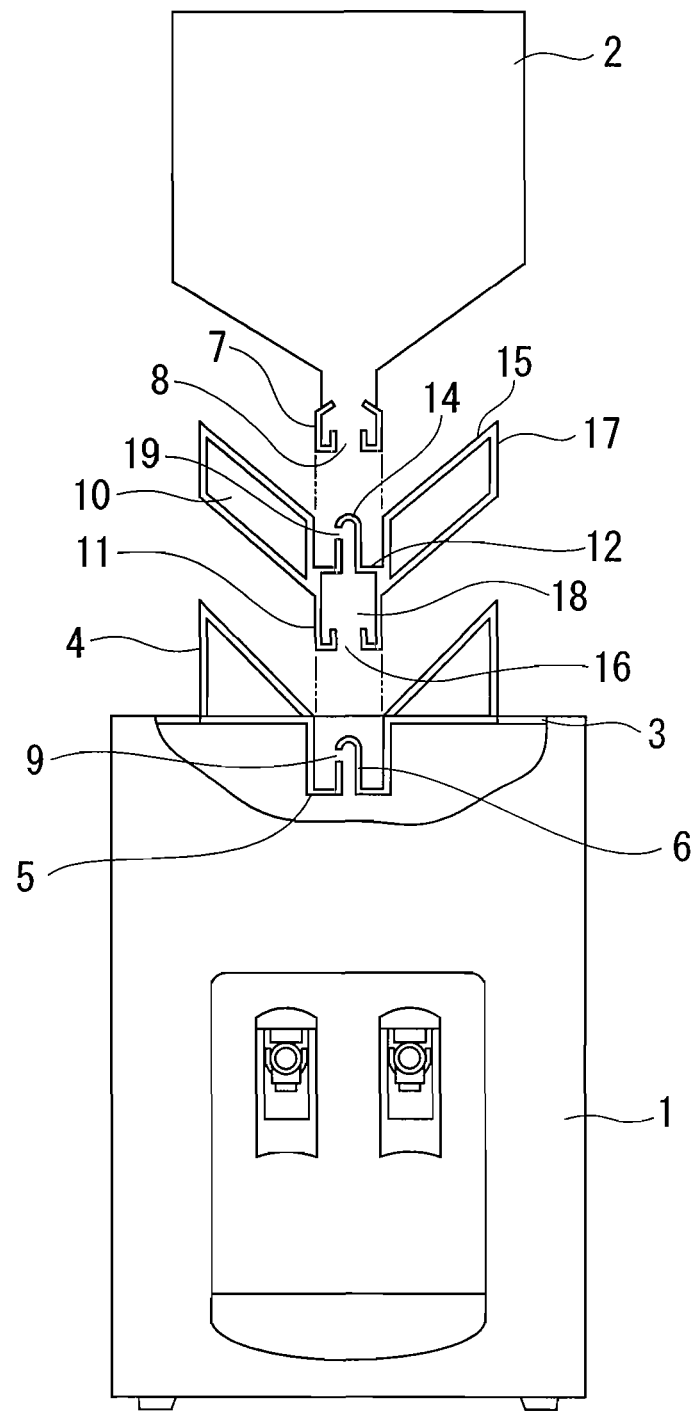
FIG. 1 is a drawing according to the first aspect of the present invention.

A first aspect of the present invention will be explained hereinafter based on FIG. 1 to FIG. 5.

A drinking water supply apparatus 1 has an angular-shape casing 3 with a rubber cushion at four corner parts, and a built-in cooling device, heater, or Peltier chip, and can supply bottled water as normal temperature water, cooling water, or hot water by the weight of water itself or using a pump or the like. At the upper portion of the casing 3, a bowl-shaped bottle holder 4 for holding a bottle 2 is provided and, at the center, a cylinder-shape recess 5, to which a neck 7 of the bottle 2 is insertable, is provided.

On the other side, the bottle 2 is provided with the cylinder-shape neck 7 which is insertable to the recess 5 of the drinking water supply apparatus 1. At the bottom of the recess 5 on the side of the drinking water supply apparatus 1, a projection 6, which is insertable to the inside of the bottle 2 and serves a conduit, is placed. In the projection 6, the inside of the projection 6 is hollow and the side of the end of the projection 6 is provided with at least one inlet hole 9 for bottled water for introducing the raw water from the bottle 2.

Also, the center of the neck 7 on the side of the bottle 2 is provided with a fitting hole 8 so as to fit the projection 6 placed at the recess 5 on the side of the drinking water supply apparatus 1. When the bottle 2 is not used, i.e., the bottle 2 is filled with water, the fitting hole 8 is closed by a stopper, not shown in figures, from the inside of the bottle.

When the drinking water supply apparatus 1 and the bottle 2 are connected, the projection 6 is inserted to the fitting hole 8 and opens the stopper of the unused bottle 2, not shown in figures. Then, the raw water inside the bottle 2 is introduced from a raw water inlet hole, through the inside of the hollow projection 6, and to the inside of the drinking water supply apparatus 1.

Figure 2:
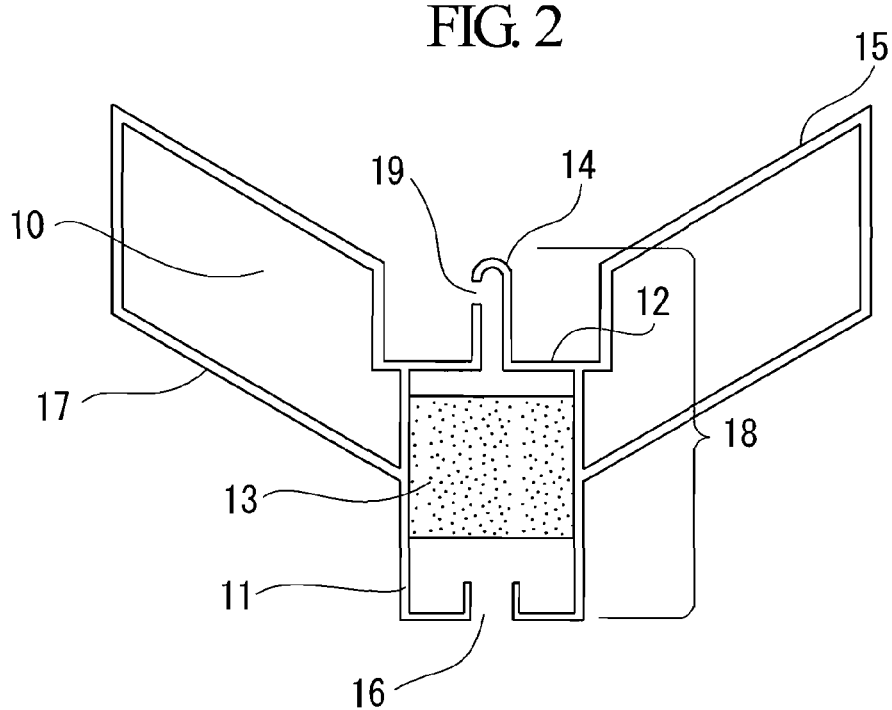
FIG. 2 is a drawing of the internal structure according to the first aspect of the present invention.

A water purifier body 10 which is mounted between the recess 5 of the drinking water supply apparatus 1 and the neck 7 of the bottle 2, as shown in FIG. 1 to FIG. 2, includes a cylinder-shape neck portion 11 of the water purifier which is insertable to the recess 5 of the drinking water supply apparatus 1 and a cylinder-shape recessed portion 12 of the water purifier, to which the neck 7 of the bottle 2 is insertable. A protruding portion 14 communicating with the neck 7 of the bottle 2 is placed at the bottom of the recessed portion 12 of the water purifier, and a raw water inlet hole 19 for introducing raw water 26 is placed around the protruding portion 14. The neck portion 11 of the water purifier is provided with a water supply inlet 16 to communicate with the projection 6 of the drinking water supply apparatus 1. As above, by placing the water purifier body 10 between the bottle 2 and the drinking water supply apparatus 1, the bottle 2 and the drinking water supply apparatus 1 communicate.

Also, the water purifier body 10 includes a water passage 18 of channel of raw water and purified water, and a main case 17 provided with a bottle supporting portion 15.

Moreover, the water purifier body 10 and the bottle holder 4 may be integrated to be a purified water filter apparatus with a holder. In this case, the bottle holder 4 attached to the drinking water supply apparatus 1 is only taken off, or both of the bottle holder 4 and the recess 5 are taken off, and the purified water filter apparatus with holder is attached. Even if the form of the bottle holder is different from that of a purified water filter apparatus with a holder, it is adaptable by attaching an adapter, not shown in figures.

In addition, the water purifier body 10 is provided with a filtration filter 13 on the way of conveyance of water from the neck 7 to the drinking water supply apparatus 1, in which the filtration filter 13 purifies the raw water 26 inside the bottle 2 introduced from the protruding portion 14, as shown in FIG. 2.

By this structure, the raw water 26 introduced from the neck 7 of the bottle 2 is purified through the filtration filter 13 placed in the water passage 18 of the water purifier body 10 to carry water as purified water to the projection 6 of the drinking water supply apparatus 1.

Also, the main case 17 is acceptable for any shape that fits to the shape of the bottle holder 4 and is easily supports the bottle 2. Various materials can be used as the material of the main case and examples thereof include metals such as stainless steel, aluminium, copper, brass, titanium, and alloy. Moreover, other examples include plastics prepared from various material such as ABS, cellulose, polyolefin (polyethylene, polypropylene), polystyrene, polyvinyl alcohol, ethenes/vinyl alcohol copolymer, polyether, poly methyl methacrylate (PMMA), polysulphone, polyacrylonitrile, polytetrafluoroethylene, polyvinylidene fluoride (PVDF), polycarbonate, polyesters, polyamide, aromatic polyamide, chloroethene, or the like. Among them, ABS resin, polystyrene, polyolefin, polycarbonate, polysulphone are preferable in consideration of handling, workability, or the like.

The filtration material of the filtration filter 13 is not limited. However, when the purpose is the filtration or removal of microparticulate matter including microbes and bacteria, a filtration film is preferable. Also, when removing residual chlorine or mold, an organic compound such as trihalomethane, or soluble metal, or when reducing hardness, an adsorption material is preferable. Moreover, the combination of a filtration film and adsorption material may be used.

Figure 3:
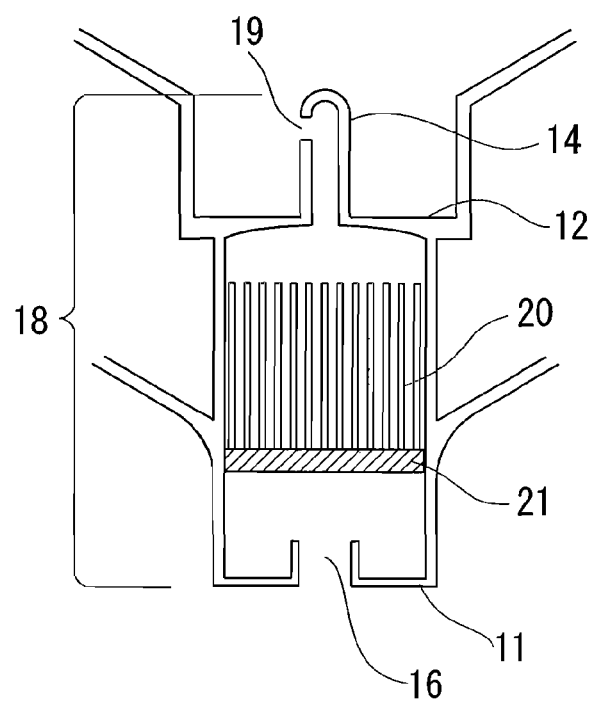
FIG. 3 is a drawing of the internal structure of the filtration filter portion according to the first aspect of the present invention.

FIG. 3 shows that the filtration filter 13 is provided with the hollow fiber membrane.

The inside of the main case 17 is provided with the purified water portion including the hollow fiber membrane 20. Because this hollow fiber membrane 20 is fixed to integrate with the main case 17 or the neck portion 11 of the water purifier body by a resin layer 21 placed at the bottom thereof, the side receiving the raw water and the side ejecting the purified water is strictly blocked.

Only the filtration filter 13 of the main case 17 may be detachable. In this case, when the filtration filter is changed, it is only necessary to change the filtration filter without changing the purified filter apparatus itself.

Examples of the hollow fiber membrane will be described below. The hollow fiber membrane is preferably used for filtrating or removing microparticulates of 0.01 μm or more including microbes and bacteria. For the hollow fiber membrane, a porous and tubular hollow fiber membrane may be used and examples of the hollow fiber membrane include compounds made from various materials such as cellulose, polyolefin (polyethylene, polypropylene), polyvinyl alcohol, ethylene/vinyl alcohol copolymer, polyether, polymethyl methacrylate (PMMA), polysulphone, polyacrylonitrile, polytetrafluoroethylene, polyvinylidene fluoride, polycarbonate, polyester, polyamide, aromatic polyamide, or the like. Among them, in consideration of handling, workability, or the like of the hollow fiber membrane, the hollow fiber membrane of polyolefin such as polyethylene, polypropylene, or the like is preferable.

Also, the hollow fiber membrane, in which the outer diameter is 20 to 2000 μm, the pore size is 0.01 to 1 μm, porosity is 20 to 90%, the thickness of the hollow fiber membrane is 5 to 300 μm, is preferable. Moreover, the pore size of 100 kPa or more, which is measured by the ASTM F-316-80 of bubble point measurement method based on JIS K3832, the part of which is changed for measuring the hollow fiber membrane, is most preferable.

Moreover, the hollow fiber membrane which has a hydrophilic group at the surface, i.e., a permanent hydrophilic hollow fiber membrane, is desirable. When the surface of the hollow fiber membrane is hydrophobic, it is difficult to filtrate water through the filtration filter by pressure due to the weight of the water itself. Because the filling density of the hollow fiber membrane is set to 20 to 70%, to improve the flowing speed of the purified water purifier body 10, it is possible to purify a relatively large amount of the raw water in a short time.

The filling density of the hollow fiber membrane is obtained by the following formula Filling density σ(%)={(A×F)/S}×100 in which S represents a cross section in the vertical direction to vertical axis of the hollow fiber membrane in the fixed part of the hollow fiber membrane, A represents the cross section of the outside diameter of a single hollow fiber membrane, and F represents the number of openings of the hollow fiber membrane.

The filling density of the hollow fiber membrane is preferable in the range within 30 to 60%, and more preferably 40 to 60%.

In order to sequentially supply the raw water 26 of the bottle 2 to the filtration filter 13 in the water purifier body 10, it is necessary to send air into the bottle 2. When air is not sent to the bottle 2, the raw water stays in the bottle 2 and thus the raw water does not flow into the water purifier body 10.

In order to prevent the flow rate to be filtrated from reducing as well as in order to prevent the water to be filtrated from being inhibited, the hydrophobic hollow fiber membrane and the hydrophilic hollow fiber membrane may be combined to be used as the filtration filter and the raw water may be filtrated through the filtration filter while adding air.

In this case, it is possible to determine the suitable combination ratio of the hydrophilic hollow fiber membrane and the hydrophobic hollow fiber membrane according to the circumstances such as the purpose, the volume of the tank, the shape of the tank, the shape/formation of the water purifier body, the formation/positioning of the hollow fiber membrane, or the like.

The hydrophobic hollow fiber membrane is combined as 0.01 to 0.8 times as the ratio of hydrophilic hollow fiber membrane 1. When prioritizing the flow rate to be filtrated, the mixed hydrophobic hollow fiber membrane is preferably 0.01 to 0.5 times. Also, when prioritizing the intake of air, the mixed hydrophobic hollow fiber membrane is preferably 0.1 to 0.8 times.

Also, because the water purifier body 10 filtrates the raw water by the weight of the raw water 26 itself in the bottle 2 as driving power, when the volume of the raw water 26 in the bottle 2 reduces, sequentially the pressure for filtration reduces, and the time for filtration becomes long. Moreover, when the volume of the bottle 2 is large, the intake of air into the bottle 2 may not smoothly operate.

In order to solve these problems, by attaching a hand-powered or electrically-powered apparatus such as a pump or the like (not shown in figures) to the purified filter apparatus, it is possible that air is forcibly taken into bottle 2 to raise the pressure in the bottle and thus the time for the filtration can be extended. In addition, by attaching a hand-powered or electrically-powered absorption apparatus, it is possible to shorten the time for the filtration.

Figure 4:
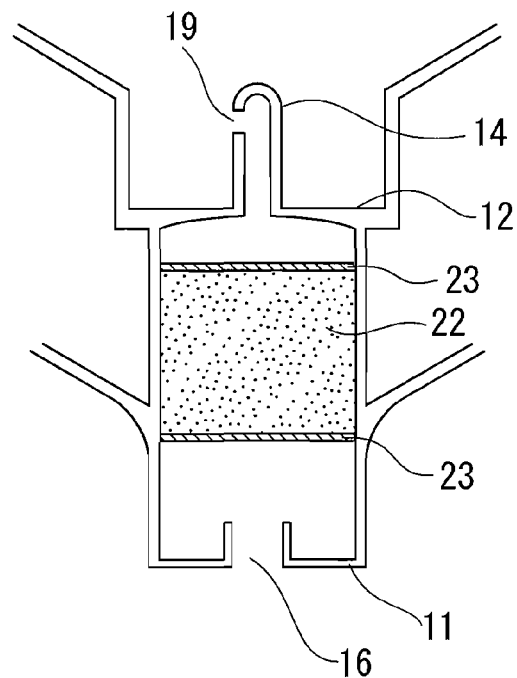
FIG. 4 is a drawing of the internal structure of the filtration filter portion according to the first aspect of the present invention.

FIG. 4 shows the adsorption material used as the filtration filter 13.

The inside of the main case 17 is provided with a purifying portion including an adsorption material 22. Each filter 23 is placed upstream and downstream of this adsorption material 22 to prevent the adsorption material 22 from bleeding outside of the main case 17.

The filter 23 includes a bonded fabric filter including polypropene, polyester or the like, a sintered filter in which each powder such as a metal, ceramic, plastics, or the like is directly bonded by heat and pressure, membrane filter, a fiber-winding filter, a filter with a relatively fine pore size by forming plastics, a mesh filter made from metal or nylon, or the like, and anything preventing the adsorption material 22 from bleeding is used. Also, a combination thereof may be used.

The filter 23 needs not to be provided all the time. In particular, when the molding material is used as the adsorption material, it is not necessary to provide the filter 23.

When the pore size of the filter 23 is fine, it is easy to become clogged. When the pore size of filter 23 is rough, the adsorption material bleeds and thus it is preferable that the pore size be 0.1 μm to 0.3 mm. The opening rate of the filter 23 is preferably 40% to 95%, and more preferably 50% to 78%.

Also, when the layer of the filter 23 is too thick, the flow rate may be reduced and thus it is preferably 30 mm or less, more preferably 10 mm or less, further preferably 5 mm or less, furthermore preferably 3 mm or less and 0.1 mm or more.

It is possible to form the filter 23 itself integrated with the adsorption material 22. For example, when fibrous active carbon, ion exchange fiber, or the like formed to be a bonded fabric is used, it is preferable because it is more effective as a filtration material.

Examples of the adsorption material 22 include a powder-type adsorption material, granular adsorption material granulated by this powder adsorption material, or fibrous adsorption material. These adsorption materials include commonly known materials, for example, a mineral adsorption material such as a nature adsorption material (nature zeolite, silver zeolite, acidic clay, or the like), synthetic adsorption material (synthetic zeolite, hydroxyapatite, molecular sieves, silica gel, silica alumina gels adsorption material, porous glass, titanium silicate, or the like) or the like; an organic type adsorption material such as powder-type active carbon, granular active carbon, fibrous active carbon, block formed active carbon, die molded active carbon, molded active carbon, molecular absorption resin, synthetic-type granular active carbon, ion-exchange resin, ion-exchange fiber, chelate resin, chelate fiber, high absorptive resin, high water absorptive fiber, oil absorptive resin, oil absorptive material, or the like.

As an adsorbent, there are a powdered adsorbent, a granulate adsorbent prepared by granulating the powdered adsorbent, a fibrous adsorbent, or the like. As such adsorbents, there are known adsorbents that include inorganic adsorbents such as natural material adsorbents (natural zeolite, silver zeolite, acidic china clay, or the like), and synthetic material adsorbents (synthetic zeolite, hydroxyapatite, phosphor ore, molecular sieve, silica gel, silica alumina gel-based adsorbent, porous glass, titanium silicate, or the like), organic adsorbents such as powdered activated carbon, granule activated carbon, fibrous activated carbon, block-like activated carbon, extrusion-molded activated carbon, formed activated carbon, molecule-adsorbing resin, synthetic material-based granule activated carbon, synthetic, ion-exchange resin, ion-exchange fiber, chelate resin, chelate fiber, high-absorption resin, high water-absorption resin, oil-absorption resin, oil-absorbing agent, or the like.

Among them, activated carbon, which has an excellent adsorbing effect for residual chlorine, organic compounds such as mold odor and trihalomethane in raw water, ion-exchange resin which is excellent in the adsorbability to soluble metal or the reduction of hardness, or synthetic adsorption material is suitably used.

Among active carbons, granular active carbon or fiber-like activated carbon is suitably used because the area of contact with the liquid to be filtered is large and the adsorbing effect and water-passing capability are excellent.

As the activated carbon, there are, for example, plant-matter (wood, cellulose, sawdust, charcoal, coconut palm shell charcoal, non-processed raw ash, or the like), coal-matter (peat, lignite, brown coal, bituminous coal, barley coal, tar, or the like), petroleum-matter activated carbon (petroleum leavings, sulfuric acid sludge, oil carbon, or the like), pulp spent liquor, synthetic resin, or the like, which are carbonized, and, according to the necessity, subjected to gas activation (calcium chloride, magnesium chloride, zinc chloride, phosphoric acid, sulfuric acid, caustic soda, KOH, or the like). As the fibrous activated carbon, there are, for example, substances which are carbonized and activated from a precursor such as polyacrylonitrile (PAN), cellulose, phenol, petroleum pitch.

As the form of the active carbon, there can be used powdered activated carbon, granular activated carbon granulated from this powdered activated carbon, granular activated carbon, fibrous activated carbon, formed activated carbon obtained by coagulating powdered and/or granular activated carbon by the use of a binder. Among these, granular activated carbon is suitably used in consideration of its handleability and the cost. As the activated carbon, one having a filling density of 0.1-0.7 g/ml, an adsorbed amount of iodine of 800-4000 mg/g, and a granule size of 0.075-6.3 mm as its description is preferable.

Moreover, it is more preferable that the adsorption material have an adsorption material with an antibiotic function in consideration of sanitation. As the adsorption material with the antibiotic function, for example, active carbon to which silver is attached and/or mixed is included.

Also, depending on the organic matter of the object to be removed, it is preferable to use an active carbon in which the rate of each active carbon pore size of micropore, transitional, and macropore are adjusted so as to improve the maximum of each removal ability. The active carbon of which the pore size is adjusted may be used by itself or by combining with conventional active carbon.

For example, when a trihalomethane is the object to be removed, it is preferable to use an active carbon with a low rate of macropore and high rate of micropore The active carbon may be used alone or by combining with the aforementioned adsorption material. For example, as an adsorption material for removing lead or the like, it is possible to use titanium silicate, hydroxy apatite, zeolite, molecular sieve, chelate resin, or the like which is filled in another layer, mixed to fill up, or impregnated to an active carbon by a binder.

Also, when water of high hardness is softened, a positive ion-exchange resin is preferably used. For removing nitrate nitrogen, nitrite nitrogen, or the like, a negative ion-exchange resin may be used.

Figure 5:
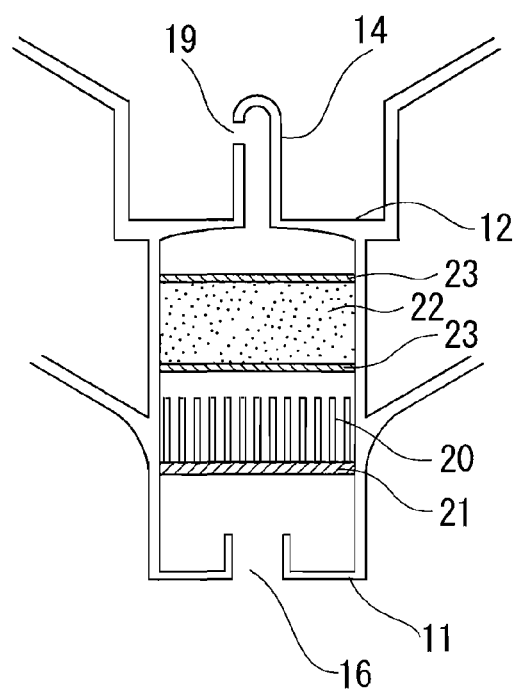
FIG. 5 is a drawing of the internal structure of the filtration filter portion according to the first aspect of the present invention.
Figure 6:
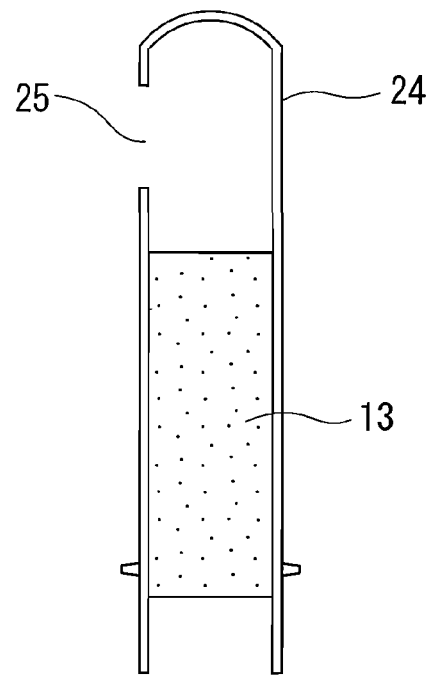
FIG. 6 is a drawing of the internal structure according to the second aspect of the present invention

FIG. 5 shows the filtration filter 13 provided with both of the aforementioned adsorption material and the aforementioned hollow fiber membrane.

The structure is more preferable as a water purifier because microparticulates including microbes and bacteria are filtrated/removed, an organic compound such as residual chlorine, mold odor, and trihalomethane, or a solubility metal can be removed, and hardness is reduced.

In this case, it is appropriate that either of the adsorption material or the hollow fiber membrane be placed. However, in consideration of bleeding of saprotrophs or the like at the portion of the adsorption material, as shown in FIG. 5, it is more preferable that the adsorption material be placed upstream (at the side of the bottle) and the hollow fiber membrane be placed downstream (at the side of the drinking water supply apparatus.)

Therefore, according to the aforementioned first aspect, because the water purifier body 10 can be detachably connected to the connecting portion between the drinking water supply apparatus 1 and the bottle 2 and it is easy to add the function for purifying water to the ordinary drinking water supply apparatus, hygienic and safe potable water can be obtained in a sufficient amount, in addition to being obtained easily and cheaply.

FIG. 6 to FIG. 9 show the second aspect of the present invention. Compared with the aforementioned first aspect, in which the water purifier body has the separate form which is detachably attached to the recess 5 of the drinking water supply apparatus 1 and the neck 7 of the bottle 2, the filtration filter according to this second aspect is placed at the inside of the water purifier body and the projected water purifier body 24, instead of the projection 6 which is insertable to the neck 7 of the bottle 2, is detachably placed at the bottom of the recess 5 of the drinking water supply apparatus 1.

When the neck 7 of the bottle 2 is inserted to the recess 5 of the drinking water supply apparatus 1, the projected water purifier body 24 is inserted to the fitting hole 8 of the bottle 2 and introduces the bottled water of the bottle 2 from the raw water inlet hole 25 to the inside of the projected water purifier body 24 of the drinking water supply apparatus.

The projected water purifier body 24 of the drinking water supply apparatus is provided with at least one of the raw water inlet holes 25 around the projected water purifier body 24 and the raw water is filtrated through this hole by the filtration filter 13.

Figure 7:
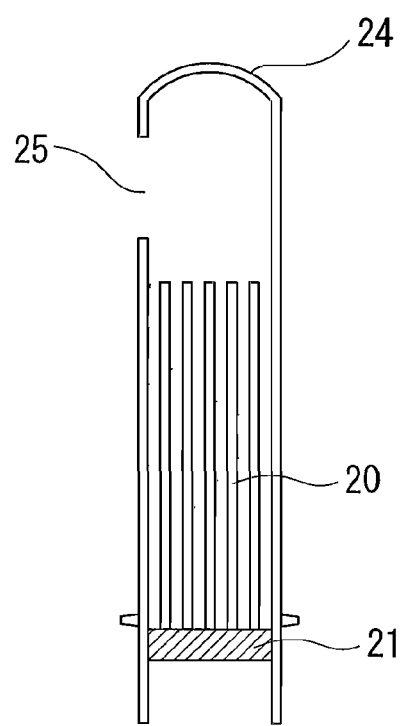
FIG. 7 is a drawing of the internal structure according to the second aspect of the present invention
Figure 8:
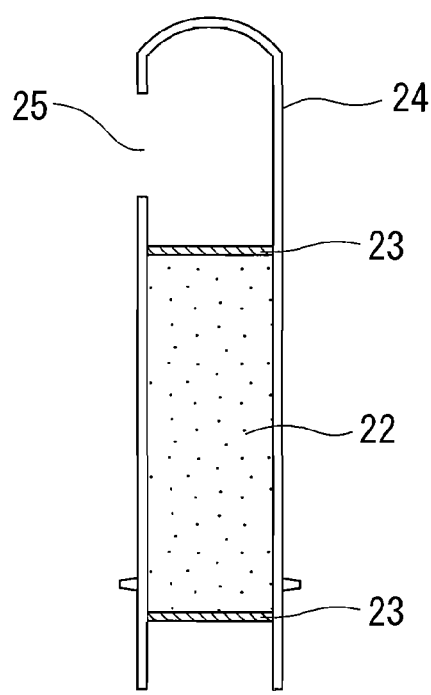
FIG. 8 is a drawing of the internal structure according to the second aspect of the present invention
Figure 9:
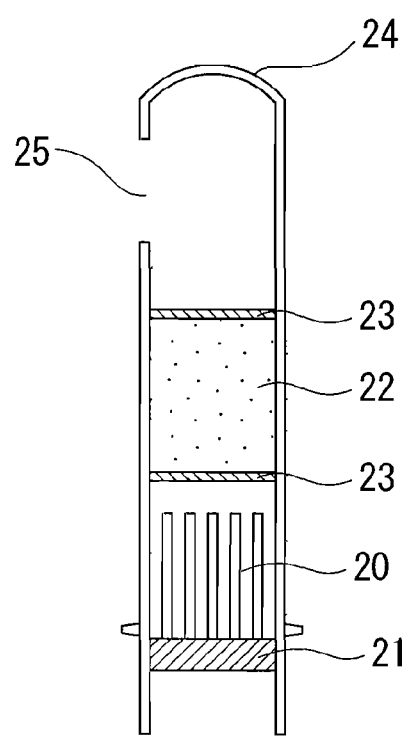
FIG. 9 is a drawing of the internal structure according to the second aspect of the present invention

In the first aspect, the filtration filter 13 can be optionally placed at the inside of the projected water purifier body 24. The filtration filter 13 is placed at the part shown in FIG. 6. In particular, FIG. 7 shows the case in which only the hollow fiber membrane 20 is only placed, FIG. 8 shows the case in which adsorption materials 22 are filled between the top and bottom filters 23, and FIG. 9 shows the case in which the filter 23, the adsorption material 22, and the hollow fiber membrane 20 are combined. Because when the raw water is filtrated through this filtration filter 13, the raw water passes through the inside of the projected water purifier body 24 hygienic and safe potable water can be obtained easily.

Moreover, because the projection 6 placed at the bottom of the recess 5 of the drinking water supply apparatus 1 is only replaced with the projected water purifier body 24, it is possible to add the function for purifying water to the drinking water supply apparatus 1 easier and cheaper compared with the first aspect.

Moreover, the structure combining the water purifier body 10 and the projected water purifier body 24 may be used. By combining the filtration material for adapting the water purifier body 10 and the filtration material for adapting the projected water purifier body 24, depending on the purpose, safe water complying with consumer requests can be obtained.

FIG. 7 shows a hollow fiber membrane used as the filtration filter.

FIG. 8 shows an adsorption material used as the filtration filter.

FIG. 9 shows a hollow fiber membrane and an adsorption material used as the filtration filter.

Because the structure of the filtration filter is the same as the above-mentioned first aspect, the same reference numbers are used to indicate the same parts and the explanation thereof is omitted.

Figure 10:
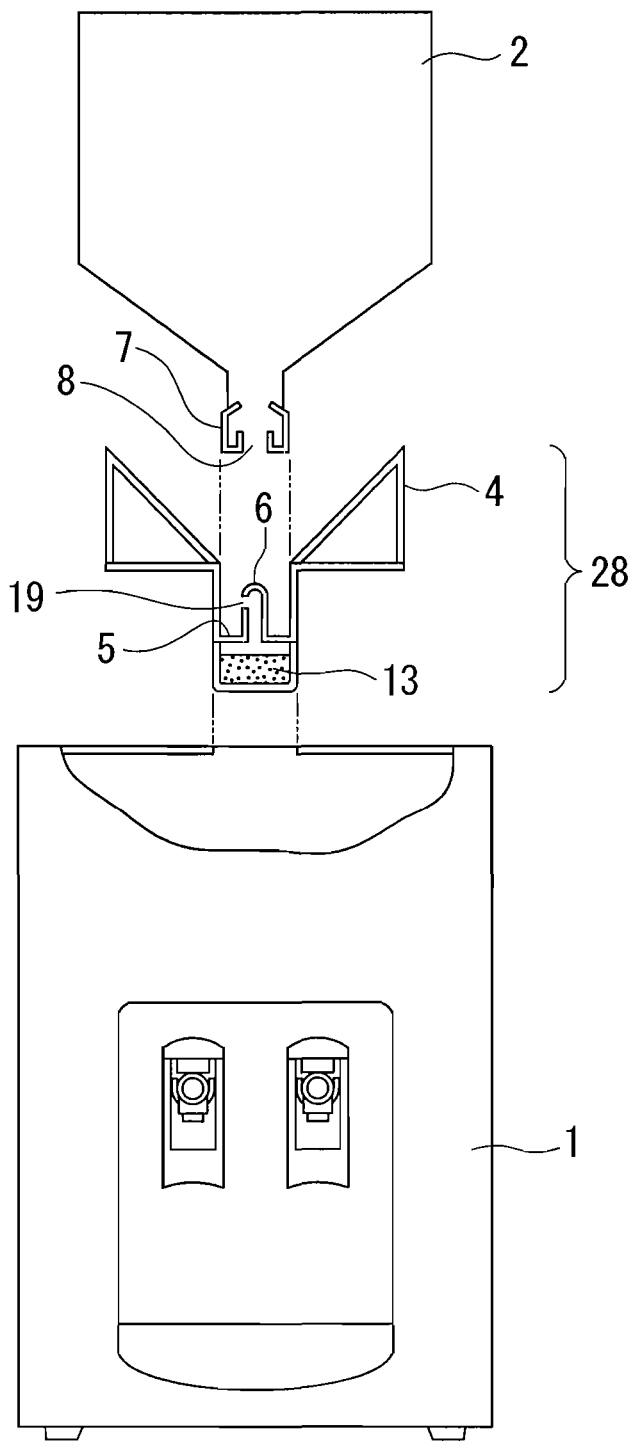
FIG. 10 is a drawing of one example according to the third aspect of the present invention.
Figure 11:
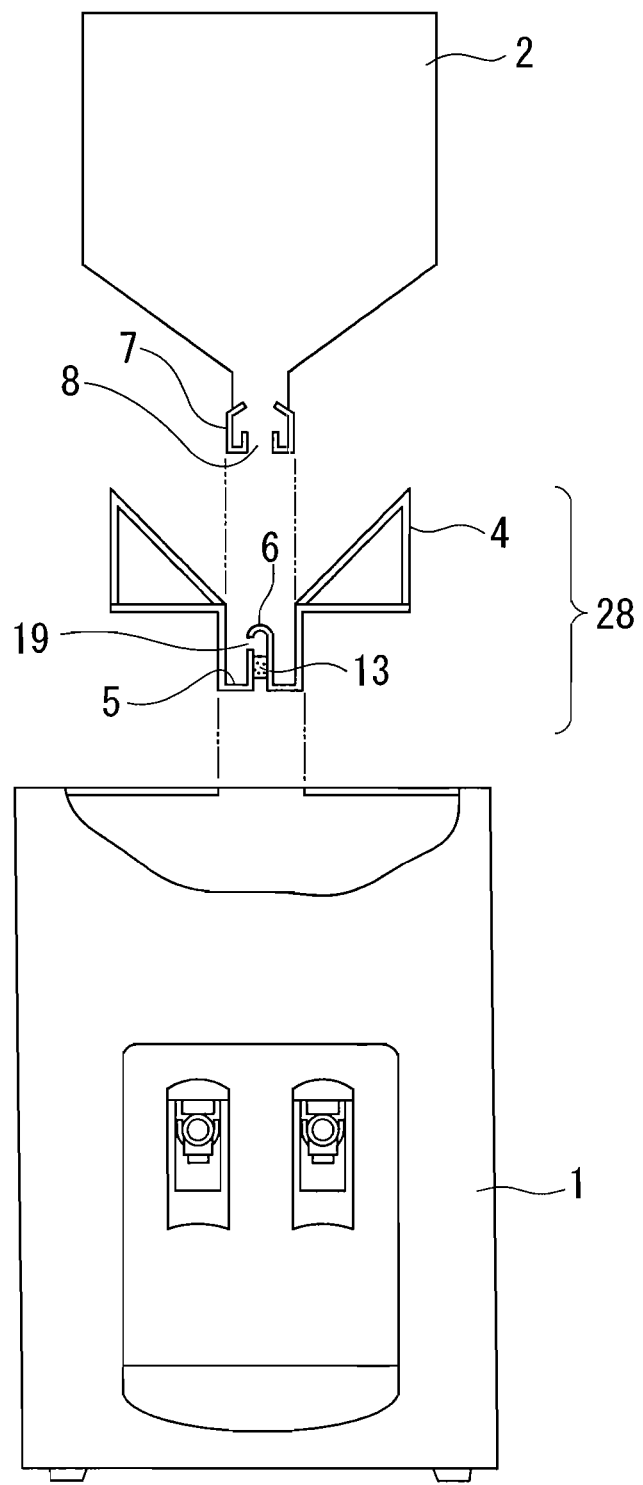
FIG. 11 is a drawing of one example according to the third aspect of the present invention.

FIG. 10 to FIG. 11 show the third aspect of the present invention. Compared with the aforementioned first aspect, in which the water purifier body has the separate form which is detachably attached to the recess 5 of the drinking water supply apparatus 1 having the bottle holder 4 and the neck 7 of the bottle 2, the filtration filter according to the third aspect is placed at the inside of the water purifier body and the water purifier body 28, which is insertable to the neck 7 of the bottle 2, is placed on the upper side of the drinking water supply apparatus 1 and detachably attached to the drinking water supply apparatus 1.

When the neck 7 of the bottle 2 is inserted to the recess 5 of the water purifier body 28, the water purifier body 25 is inserted to the fitting hole 8 of the bottle 2 and introduces the bottled water in the bottle 2 from the raw water inlet hole to the water purifier body 28.

According to this aspect, as the first aspect, the filtration filter 13 can also be optionally placed inside the water purifier body 28. In particular, FIG. 10 shows the case in which the filtration filter 13 is placed at the bottom of the protruding portion and FIG. 11 shows the case in which the filtration filter is placed at the protruding portion. When the raw water passes through the inside of the water purifier body 28, the raw water is filtrated through this filtration filter 13 to obtain hygienic and safe potable water easily.

Therefore, according to the aforementioned first to third aspects, because it is possible that the raw water of the bottle available in the market can be purified easily at home, hygienic and safe potable water can be obtained with ease and is a sufficient amount for need.

According to the present invention, because the function for purifying water can be added to the conventional drinking water supply apparatus easily, hygienic and safe potable water can be obtained in a large amount and with ease.

Also, because of the detachable attachment, the exchange can be simple. Moreover, because bacteria or microparticulates are cut out by using the hollow fiber membrane, more hygienic potable water can be obtained. In addition, by combining a hydrophobic hollow fiber for taking in air, even if the raw water is filtrated by the weight of the raw water itself, the reduction of the flow rate of the water to be filtrated, due to the pressure loss of the hollow fiber membrane, reduces and a sufficient amount of filtrated water is obtained in a short time.

The invention claimed is:

1. A system comprising a drinking water supply apparatus and a water purifier which is removable from the drinking water supply apparatus, comprising:
   (a) the drinking water supply apparatus; and
   (b) the water purifier wherein the drinking water supply apparatus includes a bottle for containing water and a main body having a recess into which a neck of the bottle is insertable, and the water purifier is placed between the recess of the main body of the drinking water supply apparatus and the neck of the bottle, wherein the water purifier comprises:
   a recessed portion into which the neck of the bottle for containing water is insertable;
   a protruding portion which is present at a bottom of the recessed portion and is insertable into an inside of the bottle;
   a neck portion which is insertable into the recess of the main body of the drinking water supply apparatus;
   a filtration filter which is present in a water passage between the neck of the bottle for containing water and a projection disposed at a bottom of the recess of the main body of the drinking water supply apparatus; and
   a hollow fiber membrane, which is a hydrophilic hollow fiber membrane, and wherein the hollow fiber membrane is a part of the filtration filter wherein:

the filtration filter is provided with a member which allows air to pass through but does not allow water to pass through, the member which allows air to pass through but does not allow water to pass through, is a hydrophobic hollow fiber membrane, and the water purifier includes a main case, wherein the shape of the main case fits to the shape of a bottle holder which is part of the main body of the drinking water supply apparatus; and wherein the projection and the bottle holder are not part of the same structure and the projection is insertable into the filter.

2. The water purifier according to claim 1, further comprising: a pressure device or a suction device.

3. The water purifier according to claim 1, further comprising a water supply inlet communicating with the projection and the protruding portion;
   wherein only the protruding portion enters the neck of the bottle; and
   wherein the projection only enters the water supply inlet.

* * * * *